United States Patent [19]

Mauch et al.

[11] 3,918,179

[45] Nov. 11, 1975

[54] REFLEX VIEWER AND TRACKING AID

[75] Inventors: Hans A. Mauch; Glendon Smith, both of Dayton, Ohio

[73] Assignee: The United States Government as represented by the Veterans Administration, Washington, D.C.

[22] Filed: June 3, 1974

[21] Appl. No.: 475,580

[52] U.S. Cl. .............................................. 35/35 A
[51] Int. Cl.² ..................... G09B 21/00; G06K 9/04
[58] Field of Search ....... 35/35 A, 35 B, 38; 40/341, 40/352, 353, 354, 355, 356

[56] References Cited
UNITED STATES PATENTS

| | | | |
|---|---|---|---|
| 2,523,755 | 9/1950 | Ford et al. | 40/356 |
| 2,735,193 | 2/1956 | Moulton | 35/35 B |
| 2,986,822 | 6/1961 | Balchuns | 35/35 B |
| 3,007,259 | 11/1961 | Abma et al. | 35/35 A |
| 3,359,425 | 12/1967 | Smith | 35/38 X |

OTHER PUBLICATIONS

"An Electronic Reading Aid for the Blind," Zworywin and Flory, 1947, pp. 139–141.
"Stentoner Reading Aid for the Blind," Mauch Laboratories, Inc., pp. 1 and 3, 12/18/73.

Primary Examiner—Wm. H. Grieb
Attorney, Agent, or Firm—Jerome P. Bloom

[57] ABSTRACT

Apparatus for teaching the blind to read by scanning print with an optical probe providing a unique support for a printed page and a tracking aid for guiding the probe. The support includes generally vertically orienting end walls biased to clamp a transparent plate between their upper extremities. One end wall is provided with means to fix a printed page over the transparent plate and to establish the page in a proper plane of reference for scanning by the optical probe. A mirror-like surface below the transplant plate reflects the print on the page, as observed from the rear thereof, as the print is scanned by the probe.

The tracking aid has the form of an oblong plate member supported by a relatively projected roller unit which facilitates its movement from line to line of the printed page. It embodies brake means which tends to maintain the same in any set position. Unique clip elements which are simultaneously engaged to the sides of the transparent plate and the lateral extremities of the tracking plate, maintain a balanced bearing relation of the roller unit to the upper surface of the transparent plate and the printed page which is superposed thereon.

17 Claims, 6 Drawing Figures

U.S. Patent  Nov. 11, 1975  3,918,179
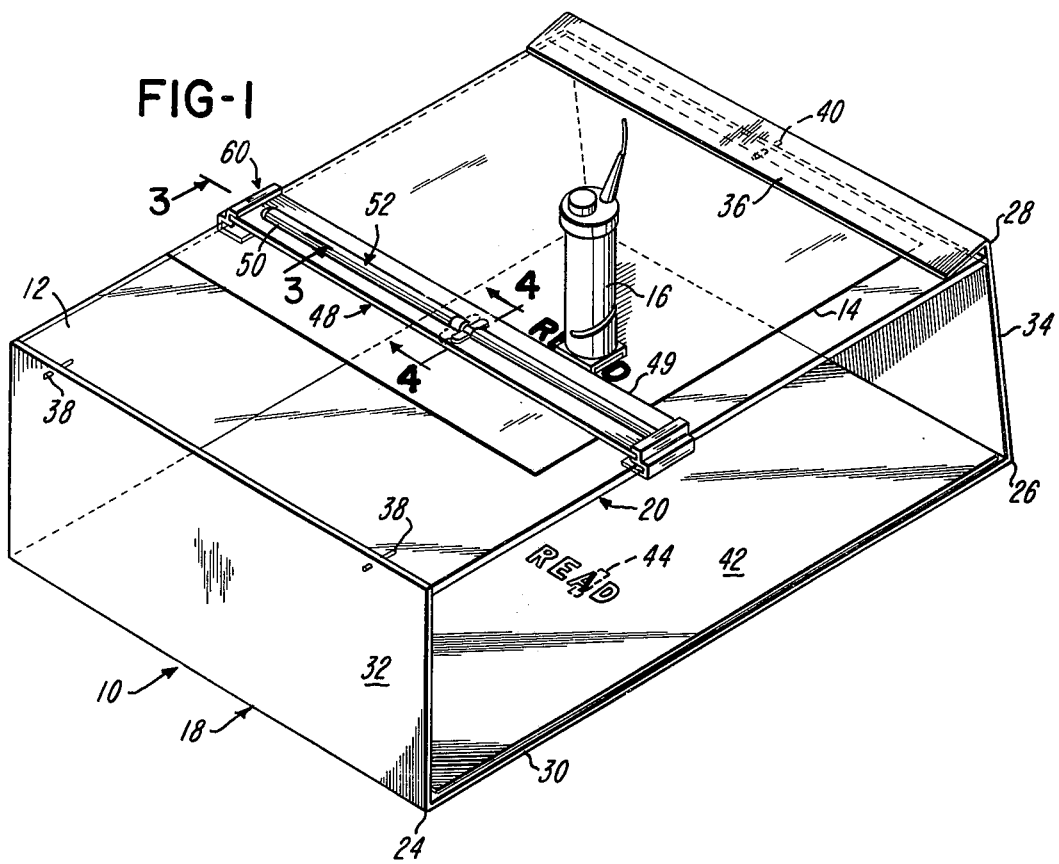
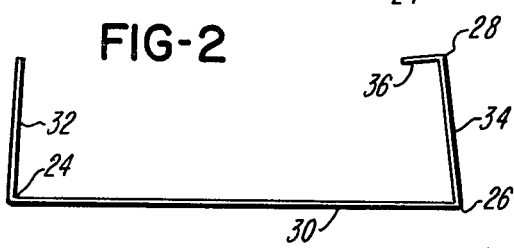
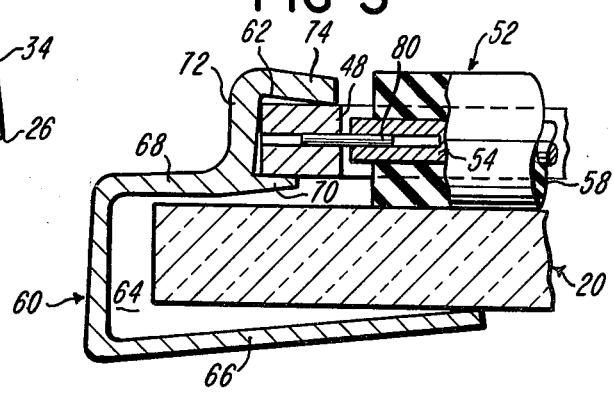
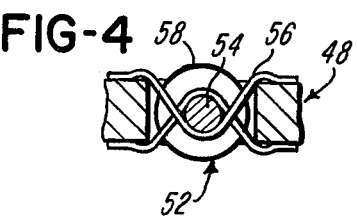
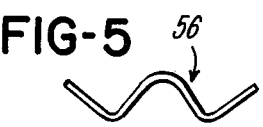
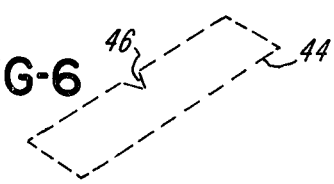

REFLEX VIEWER AND TRACKING AID

This invention provides a unique support for a printed page which facilitates teaching of a blind person to read the page using an optical scanning probe. Preferred embodiments incorporate an improved tracking aid which enables a blind person to quickly learn to establish and maintain the probe in a proper frame of reference to the print being scanned.

In a normal usage of an optical probe to scan print, the base of the probe, which includes a viewing aperture, is seated over the printed page and moved from element to element of print and from line to line thereof in a normal reading sequence. As the viewing aperture is appropriately positioned over each element of print, the probe unit senses and signals the precise character of the element of print being scanned. Relating apparatus converts each signal into a distinctive output. The form of the output may vary. For example, it may be in the form of a definitive sound or tactile in nature. In any case the blind person must learn to recognize and distinguish the output signals in order to "read" what the probe is scanning. In order that the signals he or she senses be accurate, the blind person must also learn to properly track the probe in scanning the printed page. Whatever the nature of the probe or the output provided in conjunction with the probe, teaching a blind person to use the probe requires a sighted teacher who must simultaneously see what the blind person is sensing through the medium of the probe as it is moved from element to element of a printed page. Various viewing devices have been heretofore fabricated for such purpose. Howevever, they all have some objectionable features. Most of them are quite complex as to their structural compositions and therefore quite expensive to fabricate. In some instances the probes themselves have been provided with optical beam splitters to enable a viewing aid for a teacher but this makes the probe itself much more expensive to fabricate, or to handle and difficult to service in case of malfunction.

By contrast, the viewing aid of the present invention is the ultimate of simplicity. It provides a very simply fabricated support for a printed page and a superposed optical probe. A mirror-type viewing surface is provided in conjunction with this support to directly reproduce the contents of the printed page and the relative position of the viewing aperture of the superposed probe during a scanning procedure as if seen from the top. The support also features a surface on which to set the printed page and, in conjunction therewith, clamping means which self-adjusts to firmly and uniformly grip the page in a fixed relation to the applied probe.

An additional element of the invention is an assist for the blind person who is using the probe. This element is a tracking aid which features a straight edge device and clips facilitating its quick and accurate mount over the printed page. In preferred embodiment the straight edge includes roller means which permit ease of movement of the straight edge from line to line of the page and parallel to itself. The roller means are provided with friction brake means which insure that the straight edge will tend to fix in any set position.

Accordingly, it is a primary object of the invention to provide improved apparatus constituting an aid for teaching blind persons to use an optical probe to read a printed page, which apparatus is economical to fabricate, more efficient and satisfactory in use and easy to manipulate.

Another object of the invention is to provide a new and uniquely constructed viewing aid having particular application in the teaching of a blind person in the use of an optical probe as a reading aid.

An additional object of the invention is to provide improvements in devices intended to help a blind person track an optical probe across a line of print, in a scanning procedure.

A further object of the invention is to provide a reflex viewer and a tracking aid which individually and in combination posses the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein one but not necessarily the only form of embodiment of the invention is illustrated, FIG. 1 is a view of the reflex viewer and tracking aid according to the invention shown in perspective and in an assembled condition and to illustrate the application thereto of an optical probe in a scanning or "reading" procedure;

FIG. 2 is a side elevational view of the base element of the reflex viewer illustrated, shown prior to the assembly thereto of the viewer superstructure which serves to provide a plane of reference for a printed page and a superposed optical probe;

FIG. 3 is a sectional view taken on line 3—3 of FIG. 1;

FIG. 4 is a fragmentary sectional view taken on line 4—4 of FIG. 1;

FIG. 5 is a detail view, in vertical elevation, of a brake element embodied in the tracking device illustrated in FIGS. 1 and 4; and FIG. 6 is an enlarged reproduction of the outline of the viewing aperture in the base of the optical probe illustrated in FIG. 1.

Like parts are indicated by similar characters of reference throughout the several views.

As seen in the drawings, the reflex viewer of the present invention provides a support 10 the uppermost surface 12 of which is adapted to mount a printed page 14 and, in superposed relation thereto, an optical scanning probe 16. In the embodiment illustrated the support 10 includes a spring formed base 18 which is open at its sides and supports, at its top, a plate 20 of clear plastic. The mount of this plate will be further described.

The base 18 is formed from a single oblong sheet of metal bent at three longitudinally spaced locations 24, 26 and 28 in lines extending transversely thereof and at right angles to its lateral edges. These three ends provide the base 18 with a relatively elongate, generally rectangular, bottom section 30, two generally vertically projecting sections which form end walls 32 and 34 and a flange-like lip segment 36 which is formed on an upper edge of the end wall 34 and bent at a right angle thereto to project in the general direction of the end wall 32. The vertical extent of the end wall 34 is made slightly greater than that of the end wall 32. Also, as the bends are effected in the original single oblong sheet of metal, the end walls 32 and 34 are caused to incline inwardly of and over the adjacent ends of the bottom section 30 and are so biased to form therewith angles of slightly less than 90°. The angle between the bottom section 30 and the end wall 34 is made slightly smaller than that provided between the bottom section 30 and the end wall 32.

Anchored in and projected from one end of the plastic plate 20, in an adjacent spaced relation to its upper edge, are a pair of transversely spaced pins 38. The pins 38 are arranged to project in the direction of the end wall 32. The opposite end of plate 20 similarly mounts, in a laterally centered relation to the pins 38, a pin 40. As may be seen from FIG. 1 of the drawings, the three pins, 38 and 40, serve to support the respective ends of the clear plastic plate 20. For this purpose the end wall 32 is drilled to provide laterally spaced recesses accommodating the pins 38 while the opposite end wall 34 is drilled to provide a similar recess so as to accomodate the pin 40.

Referring further to the base 18, superposed on and extending coextensively of the bottom section 30 is a rectangular sheet of metal the uppermost surface 42 of which is highly polished to provide it with the characteristics of a mirror-type reflecting surface. While in this instance the separate element is utilized to provide a mirror surface in underlying relation to the plate 20, the same mirror surface may be provided by coating the uppermost surface of the bottom section 30 with suitable material.

As has been noted previously, the forming of the end walls 32 and 34 sets them in positions that they are biased towards each other. To install the plate 20, with the bottom section 30 of the base plate 18 resting on a solid support surface such as provided by a table, and with the end wall 34 positioned remote from the assembler, the plate 20 may be positioned on the bottom surface 42 between the end walls and the one edge thereof containing a single pin 40 lifted to insert this pin into the receses provided in the end wall 34. Then the end walls 32 and 34 may be spread as the opposite end of the plate 20 is lifted to align the pins 38 therein with the recesses in end wall 32. As the pins 38 align with their mating recesses in the adjacent end wall 34 these pins will snap in their appropriate recesses. As will be self-evident, the mounting of the plate 20 in this manner will tension the end walls which are slightly spread by the application of the plate. As a result of this procedure and the slight vertical projection of the end wall 34 above the surface 12 of the plate 20 so mounted, the flange-like lip 36 will have its projected edge engage in biased bearing relation to the surface 12 in adjacent spaced relation to the end thereof mounted by the pin 40.

To apply a printed page to the surface 12 of the plate 20, for scanning thereof with a device such as an optical probe, the page is oriented with its print side up, whereupon the fingers may be applied to the end wall 32 of the base 18 to bias the same in th direction of the end wall 34 and to produce a force thereon through the plate 20 sufficient to open a gap between the projected lip 36 and the plate 20. This enables a person, sighted or unsighted, to slip one end of the printed page under the lip 36. A slight alignment of the page with one side edge of the plate may be readily sensed and set by the fingers and upon release of the force supplied to bias the lip 36 from the page 20, the edge of the lip will once more bias against the plate 20 to produce a squeezing force to hold the printed page in its fixed position in respect to the transparent plate. In this position the lines of print should be generally at right angles to the aforementioned one side edge of plate 20.

Attention is directed to the fact that the feature of using a single mounting pin 40 at the end of the plate 20 overlapped by the lip 36 allows the plate to twist and self-adjust at this end to equalize the holding pressure along the lip and establishes the printed page in a fixed position as well as the surface 12 in a proper frame of reference for the application thereto of the base of an optical probe which includes its viewing aperture.

It is to be understood that when the optical probe 16 is applied over the printed page that the viewing aperture in the base thereof which positions immediately over the print is illuminated. Since the plate 20 is made transparent, the outline 44 of the viewing aperture of the probe will be reflected on and reproduced in mirror surface 42 positioned below and in vertically spaced relation to the surface 12 of the plate 20.

In the example illustrated, referring to FIGS. 1 and 6, the illuminated aperture of the probe is rectangular in character and includes a single spike-like projection 46 extended inwardly of its outline, at one side thereof. The projection 46 defines the center of the line defined by the aperture outline 44.

The viewing aid of the invention thus provided constitutes a reflex viewer which, on application of a printed page to its surface 12 and the superposition of a probe 16, also has reproduced by its mirror surface 42 the print on the overlying page. Since the mirror sees the print from the rear, the mirror image of the print will be reproduced as observed by the optical probe from the top. The mirror reflection of the print will also have superposed thereon the outline of the illuminated viewing aperture of the probe. Thus, an observer, such as a sighted teacher, can constantly watch the tracking position of the probe in relation to the print as induced by the blind person operating the probe.

As previously described, the invention contemplates the use, in conjunction with the reflex viewer, of an improved tracking aid which can be readily applied and manipulated by a blind person. As seen in the drawings, this tracking aid comprises an oblong rectangular tracking plate 48 having a central longitudinally extending slot 50 accommodating a roller unit 52. The roller unit 52 includes a cylindrical rod 54 which extends substantially the length of the slot 50 and is rotatably mounted to the tracking plate 48 by a pair of pins 80. The middle of the rod 54 is surrounded by two braking springs 56.

As seen in FIG. 5, in its original form the brake spring 56 has the configuration of a laterally expanded letter w the central portion of which, on installation, presses against the rod 54, as seen in FIG. 4, as the lateral extensions are caused to bias against and overlap the outer surface of plate 48 to either side of the slot. As shown, in their application, brake springs 56 are positioned in side by side relation and are reversely oriented to provide that the central or V-shaped portion of one overlies and the same portion of the other underlies the rod while their lateral wing portions are respectively caused to underlie and overlie and bias against the respectively opposite surface portions of the plate 48 to either side of the slot 50. This may be particularly observed with reference to the showing in FIG. 4.

The rod 54 is thus centrally confined between overlying and underlying portions of brake springs 56 and centered in the slot 50 between the opposite surfaces of the plate 48. To either side of the brake springs 56 the rod 54 is covered by an identical sleeve 58 of elastic high friction material. The diameter of the sleeve 58 has a dimension greater than the thickness of the plate 48 and as thus provided projects oppositely therefrom to provide a bearing surface for the tracking plate by means of which it may be mounted in a superposed relation to a printed page 14, in adjacent spaced relation thereto. The roller unit will through the medium of the sleeves 58 provide a means for facilitating movement from line to line of the print on the printed page parallel with itself while the braking springs together with the nature of the material of the sleeves 58 tend to maintain the tracking plate in any set position.

In a transversely disposed position the tracking plate 48 substantially bridges the plate 20 and may be simply and easily connected to the plate 20 through the medium of clips 60. Each of the clip members 60 has a unique form. With reference to FIGS. 1 and 3 of the drawings, the clip 60 is formed to provide it with two channel-shaped recesses which open from one side in immediately superposed relation and extend the length thereof. The upper recess 62 is relatively shallow and the lower recess 64 is substantially deeper. As will be seen, the upper channel-shaped recess 62 is formed to enable the clip to be frictionally slip fit in engagement with one end of the tracking plate 48 while the lower recess 64 is formed to relatively freely receive one side edge of the plate 20 and frictionally grip to its undersurface.

Considering the clip 60 in greater detail, as seen in cross section in FIG. 3, the lower portion thereof has the general shape of a "U" oriented on its side to form the channel-shaped recess 64. The lowermost arm 66 of this U is biased and inclined towards the uppermost arm 68 and has a greater length than the arm 68. Also a right angled extension 72 on the upper or outer side of the upper and shorter arm 68, which connects thereto on a line adjacent but spaced from its projected extremity, forms with the projected extremity of the arm 68 the relatively shallow channel-shaped recess 62.

As illustrated, there are two clip members 60 for mounting the tracking plate 48 in an overlying relation to the plate 12. To apply the clips, the tracking plate 48 is first placed over the printed page 14 superposed on the surface 12 sp as to extend from side to side thereof with its ends positioned substantially equidistant from the lateral edges of the plate 20. It is noted that the lowermost arm 66 of the clip is the longest and most flexible while the projected extremities 70 and 74 of the arm 68 which form the upper channel-shaped recess 62 are shorter and stiffer.

In application of a clip, the projected lip of the arm 74 is first hooked over the upper surface to one end of the tracking plate 48. Holding the clip at about 45° to the tracking plate to dispose the projected extremity of the arm 66 below the adjacent lateral edge of the plate 20, one then applies a downward twisting force, in the course of which the projected extremity of the arm 66 rides on the undersurface of the plate 20 while the channel-shaped recess 64 accomodates its lateral edge which is otherwise free of the clips, as seen in FIG. 3 of the drawings. In the course of the rotation of the clip, the free entry of the lateral edge of the plate 20 and of the edge of the page 14, if present, into the channel 64 is insured by the inclination of the surface of the lowermost side of the arm 70 formed by the projected extremity of the arm 68. In the process, the channel-shaped recess 62 engages the end of the tracking plate 48. The end of the tracking plate 48 is frictionally held within the channel-shaped recess 62 because it is biased clockwise by the arm 66 which is in bearing engagement at its projected extremity with the undersurface of the plate 20. Due to the leverage so provided, there is a torque applied which is great enough to hold the end of the tracking plate to which the clip is applied securely in place while moving the tracking plate during line change. The second clip member 60 is likewise applied to the opposite end of the tracking plate 20. The forces so produced by the application of the clip members 60 serve also to press the friction sleeves 58 of the roller unit 52 embodied in the tracking plate down into the printed page to maintain a parallel orientation of the straight edge 49 as the plate is rolled up or down the printed page by the user's fingertips being applied to the upper exposed surface portions of the sleeves. Once the clips are installed, either end of the tracking plate 48 may be freely adjusted for skew by applying an upward finger pressure to the underside of arm 66 thus lifting that end of the tracking plate 48 and the associated sleeve 58 from the paper 14 whereupon the tracking plate may be moved up or down without moving the paper.

It may be seen that the particular configuration of the clip members 60 enable either a sighted person or a blind person to readily apply the same in mounting the tracking unit. The unique construction of the clip member 60 and the manner of its application lends a facility to movement of the clip with reference to the plate 20 and thereby facilitates the rolling movement of the tracking plate 48 parallel with the lines of print provided on the printed page superposed on the surface 12 of the plate 20.

From the foregoing, it will be seen that the invention provides a viewing aid wherein the walls 32 and 34 of the base member 18 provide a frame supporting the transparent plate 20 through the medium of pins 38 and 40 in a manner that the application and bias thereto of the lip 36 provides a stabilization and proper orientation of the transparent plate. As described, moreover, a bias against the end wall 32 readily includes a lifting of the lip 36 so that a printed page may be applied to the surface 12 and, as one side edge of the paper, at least, is placed in alignment with a side edge of the plate 20, on release of the bias against the plate 32, the printed page will be frictionally gripped and squeezed to the surface 12 so as to establish a precise orientation thereof wherein the lines of print should be approximately perpendicular to a lateral edge of the plate 20. Further, the tracking plate 48 may be readily applied over the printed page, as previously described, and easily connected to the plate 20 through the medium of the clip members 60 and adjusted so that the straight edge 49 will position in parallel with the lines of print also. The edge 49, as seen in FIG. 1 of the drawings, will serve as an abutment for the base of a probe 16 as it is moved across a line of print in scanning relation to the elements thereof.

The reflex viewer as so provided has open sides clearly exposing the reproduction of the print being scanned by means of the mirror surface 42, in conjunction with the outline 44 of the illuminated aperture of the scanning probe. The relationship of the outline 44 to the print as seen in the mirror surface 42 will indicate whether the scanning track of the probe is accurate or whether adjustment of the track is required. Of course, using the tracking plate 48 as connected, adjustment is relatively simple. In any event, a teacher observing the surface 42 can readily follow the pattern of movement of the probe by a blind person and can then advise the blind person how to more accurately move the probe or adjust the tracking plate so he or she may become more adept and more familiar with the needs of setup and guidance in use thereof in scannning and sensing print. Simultaneous with receipt of this visual information the teacher can also listen to or otherwise sense the signals being transmitted through the medium of the probe so as to enable the teacher to not only assist the student in using the probe but advising the student when he or she is sensing an element of print and thereby pinpointing the signal which identifies that particular element of print.

The tracking device is of considerable advantage in that due to its construction and ease of manipulation the blind person can readily gain skill in its application. In applying and using the tracking aid in reference to the surface 12 a student can quickly familiarize himself with the feel of its proper orientation of the printed page and the guidance of the probe.

In the teaching procedure the student would first be required to use the invention apparatus in conjunction with the tracking plate 48 clipped to the plate 20. With experience gained in this respect, the blind person can then use the tracking plate on the viewer without the benefit of the clips 60. Subsequently the blind person learns to use the reflex viewer without the tracking aid, having gained confidence in the sensing of relative movements required of the probe in relation to the printed age with experience acquired in using the tracking aid. Finally the blind person becomes so adept and knowledgeable as to the signals representing the elements of print and the relative positioning and movement of the probe in respect to print that no aids are further necessary and the blind person can then read with a probe at a relatively high speed, considering the absence of sight.

From the above description, it will be apparent that there is thus provided a device of the character described possessing the particular features of advantage before enumerated as desirable, but which is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described our invention, we claim:

1. Apparatus particularly advantageous for use in teaching a blind person to use an optical probe to scan and read print or the like comprising a support for a printed page including generally vertically orienting end walls bridged by a member which is transparent, at least in part, said member providing a surface for mounting a printed page, and means providing a mirror-like surface in underlying vertically spaced relation to the said transparent part of said member adapted to mirror print on the page, as observed from the rear thereof, as the print is scanned by the optical probe.

2. Apparatus as in claim 1 characterized by said support constituting a frame means including a base mounting said vertically orienting end walls and said end walls mounting means for a slip fit therebetween of said member.

3. Apparatus as in claim 1 characterized by one of said end walls having a biased relation to the other and including a flange-like lip which is biased to dispose in an overlying relation to one end of said member to serve to frictionally grip one end of a page which may be superposed on said member for scanning by said probe.

4. Apparatus as in claim 1 characterized by said support being formed in its original state to comprise a base having said end walls integrally connected therewith and generally vertically projected therefrom and said base providing uppermost thereon said mirror-like surface which is positioned directly under said member.

5. Apparatus as in claim 1 characterized by said support being comprised of a single sheet-like element bent to provide a base and said vertically projected end walls, at least one of which is inclined to the other, and said end walls being tensioned by the mounting thereto of said member.

6. Apparatus as in claim 5 characterized by means in connection with said end walls providing a three point mount for said member and one of said end walls having in connection therewith a flange-like lip which is biased thereby to dispose in an overlying relation to one end of said member.

7. Apparatus as in claim 6 characterized by both of said end walls being inclined to overlie said base in the original formation thereof and including recesses for engaging complementary pin-like means in the opposite ends of said member to establish said member thereby in a clamped relation between said end walls.

8. Apparatus as in claim 1 characterized by said member being releasably mounted to said vertically projected end walls by three pins, one end of said member being supported in connection with one end wall by two said pins and the other end of said member being supported on the opposite end wall by a single pin which is laterally centered in respect to the said two pins and said end wall to which the other end of said member is connected by one pin including means applying a bias to the adjacent end of said member to establish the uppermost surface thereof in a balanced frame of reference for a superposed page of print and a related optical probe.

9. Apparatus as in claim 8 characterized by said means applying a bias to said member being a flange-like lip which is projected from said opposite end wall.

10. Apparatus of claim 1 characterized by a tracking element superposed on said transparent member including relatively projected roller means which bears for rotation on the uppermost surface of said transparent member and a printed page which may be interposed therebetween and means providing a friction brake, mounted on said tracking element and interrelated with said roller means, arranged to inihibit movement of said roller means from a set position absent the application of a propelling force to said roller means.

11. Apparatus as set forth on claim 10 characterized by said tracking element being an oblong plate-like structure having a central longitudinally extending slot and said roller means being disposed in and relatively projected from said slot.

12. Apparatus as in claim 11 characterized by said roller means being supported within said slot through the medium of bearing pins at each end of the roller means.

13. Apparatus as set forth in claim 12 characterized by said friction brake including a pair of side by side spring elements the ends of which are supported by opposite surface portions of said tracking element and the central portions of which contain and bear on respectively opposite surface portions of structure embodied in said roller means.

14. Apparatus as in claim 13 characterized by clip means having channeled sides, one channel of which accommodates one end of said tracking element and another of which acomodates a lateral edge of said transparent plate and said clip means being formed to apply a bias to the ends of said tracking element to maintain said clip means in a bearing relation to said ends of said tracking element and to said transparent plate and a printed page which may be interposed therebetween.

15. A tracking device for use in scanning print or the like comprising a body having a straight edge, roller means in connection with and providing a support for said body, and means engaged with said body and said roller means constituting a friction brake operating to inhibit movement of said roller means from a set position, said body being a plate-like object having a central longitudinally extending slot and said roller means being disposed in and relatively projected from said slot.

16. Apparatus as in claim 15 characterized by said brake means being comprised of a pair of side by side springs the ends of which are supported by opposite surface portions of said body and the central portions of which confine and bear on respectively opposite surface portions of the structure defining said roller means.

17. Apparatus as set forth in claim 15 characterized by clip means, applied to each of remote lateral edge portions of said body, each said clip means having one side thereof defined by means forming a plurality of relatively superposed channels, one of which channels accommodates one of said remote lateral edge portions of said body and another of which is adapted to accommodate a lateral edge of a plate-like element to a surface of which said body is applied, said clip means being so formed as to contain said remote lateral edges of said body and bias said roller means into bearing engagment with said surface of which the body is applied.

* * * * *

UNITED STATES PATENT AND TRADEMARK OFFICE
CERTIFICATE OF CORRECTION

PATENT NO. : 3,918,179
DATED, : November 11, 1975
INVENTOR(S) : Hans A. Mauch and Glendon Smith It is certified that error appears in the above–identified patent and that said Letters Patent are hereby corrected as shown below:

Col. 1, line 19, "ing" is corrected to read -- ed --;

line 24, quote marks are inserted following -- read --;

line 34, "howevever" is corrected to read -- However --;

line 36, "compositions" is corrected to read -- composition --;

line 44, "of" is corrected to read -- in --.

Col. 2, line 13, "posses" is corrected to read -- possess --;

line 31, "elevational" is corrected to read -- elevation --;

line 59, "ends" is corrected to read -- bends --.

Col. 3, line 34, "plate" is deleted.

line 40, "receses" is corrected to read -- recess --;

line 59, "th" is corrected to read -- the --;

line 64, "slight" is corrected to read -- side --

UNITED STATES PATENT AND TRADEMARK OFFICE
CERTIFICATE OF CORRECTION

PATENT NO. : 3,918,179
DATED : November 11, 1975
INVENTOR(S) : Hans A. Mauch and Glendon Smith It is certified that error appears in the above-identified patent and that said Letters Patent are hereby corrected as shown below:

Col. 5, line 49, "sp" is corrected to read -- so --;

line 65, "clips" is corrected to read -- clip --.

Col. 6, line 14, the following is inserted between "tracking plate" and 20:
-- 48 and the opposite lateral edge of the plate --;

Col. 6, line 18, "into" is corrected to read -- onto --;

line 47, "cludes" is corrected to read -- duces --.

Col. 7, line 20, -- of the invention -- is inserted following "device";

line 25, "of" (2nd occurrence) is corrected to read -- on --;

line 36, "age" is corrected to read -- page --;

line 47, -- obviously -- is inserted following "which".

Col. 8, line 59, (Claim 10, line 1), "of" is corrected to read -- as in --.

Col. 9, line 1 (Claim 11, line 1), "on" is corrected to read -- in --;

line 20 (Claim 14, line 4), "acomodates" is corrected to read -- accommodates --.

Col. 10, last line, "of" is corrected to read -- to --.

Signed and Sealed this fourth Day of May 1976

[SEAL]

Attest:

RUTH C. MASON
*Attesting Officer*

C. MARSHALL DANN
*Commissioner of Patents and Trademarks*